United States Patent [19]
Nagao et al.

[11] 3,806,948
[45] Apr. 23, 1974

[54] DIGITALLY CONTROLLED RECORDING DEVICE

[75] Inventors: Shuji Nagao, Kobe; Hisao Magoshi, Osaka; Nobuyuki Kaneko, Kobe, all of Japan

[73] Assignee: Furuno Electric Co., Ltd., Nishinomiya-shi, Hyogo-ken, Japan

[22] Filed: June 11, 1973

[21] Appl. No.: 368,839

[52] U.S. Cl. ............................ 346/33 R, 346/139 D
[51] Int. Cl. .............................................. G01d 9/02
[58] Field of Search ............ 346/33 R, 33 EC, 33 B, 346/14, 139 A, 139 D, 139 R, 74 E, 74 S, 74 SB, 74 SC

[56] References Cited
UNITED STATES PATENTS

| 2,579,831 | 12/1951 | Keinath | 346/33 R |
| 2,712,128 | 6/1955 | Woodruff | 346/33 R X |
| 3,419,878 | 12/1968 | Maurer | 346/139 D X |

Primary Examiner—Joseph W. Hartary

[57] ABSTRACT

A recorder for recording digital information directly and without the need for digital to analog conversion. This is attained by means for driving a recording pen by clock pulses, means for counting the clock pulses and a coincidence circuit comparing the successive count outputs with the digital signal and producing a recording signal when coincidence is achieved whereupon said signal is fed to the recording pen.

5 Claims, 11 Drawing Figures

DIGITALLY CONTROLLED RECORDING DEVICE

This invention relates to a novel and improved recording device which is controlled directly by digital information.

In prior recorders, such as an XY-recorder which is used for automatically recording measured values on recording paper, a recording pen is driven by a suitable motor in the X or Y direction and, at the same time, a potentiometer is interlocked with and operated by the recording pen to detect the position of the recording pen. In the case of recording a measured value from measuring apparatus, a d.c. voltage corresponding to the measured value is applied to another potentiometer and the recording pen is driven to such a position that the latter potentiometer is balanced with the former one. In such a recorder, therefore, the measured value to be recorded must be supplied in a form of analog information such as a d.c. voltage. Accordingly, a digital-analog converter is required in the case of recording measured values obtained from a digital measuring apparatus.

Therefore, an object of this invention is to provide a novel and improved recorder which can record digital information as it is without the need for digital-analog conversion.

According to this invention, the recording device comprises a clock pulse generator for producing a train of clock pulses, a pulse motor driven intermittently by said clock pulses, a recording pen driven across a recording paper by said pulse motor, a start detecting device for producing a start signal when said recording pen comes into a predetermined reference position on the recording paper, a counting device for counting said clock pulses which initiates its counting operation in response to said start signal and successively produces count outputs, and a coincidence circuit for comparing digital information to be recorded with the successive count outputs from said counting device and producing a recording signal when a coincidence is obtained therebetween. The recording pen is energized by said recording signal to effect a record on the recording paper in a suitable manner.

The invention will be described in detail hereinunder with reference to the accompanying drawings.

In the Drawings.

Throughout the drawings, like reference numerals are used to denote corresponding structural components.

Figure 1:
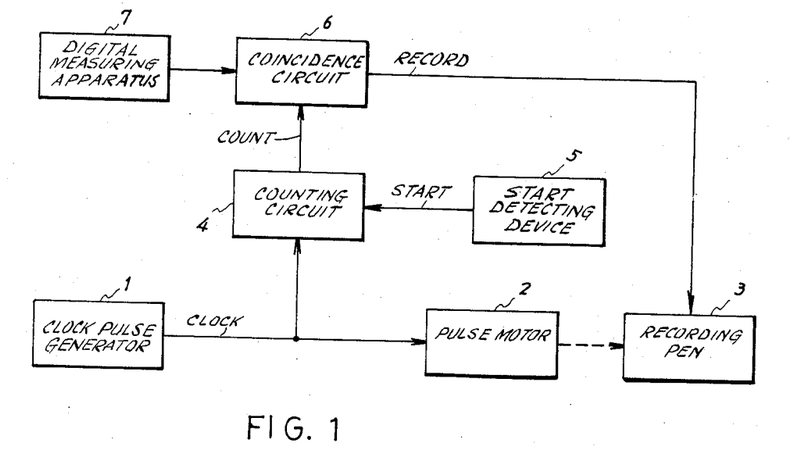
FIG. 1 is a schematic block diagram representing a fundamental configuration of the recording device according to this invention.

Referring first to FIG. 1, a clock pulse generator 1 which produces a suitable train of clock pulses is connected to a pulse motor 2 and the pulse motor 2 is driven intermittently by the clock pulses. The pulse motor 2 is mechanically coupled to a recording pen 3 as indicated by a dashed arrow to drive the recording pen 3 across the recording paper (not shown) in a predetermined direction. The clock pulse generator 1 is also connected to a counting circuit 4 and the counting circuit 4 counts the supplied clock pulses from the generator 1 and successively produces count outputs. In addition, a start detecting device 5 is provided for detecting the recording pen 3 when the latter is in a predetermined reference position such as the start point and producing a start signal. The counting circuit 4 is arranged so as to initiate the counting operation in response to the start signal from the start detecting device 5 which may be a contact switch for example. The output of the counting circuit 4 is supplied to a coincidence circuit 6 having another input connected to digital measuring apparatus 7. The coincidence circuit 6 is arranged so as to compare the digital information supplied from the digital measuring apparatus 7 with the successive count outputs from the counting circuit 4 and produces a recording signal when a coincidence is obtained therebetween. The recording signal is applied to the recording pen 3 to actuate it to record a spot on the recording paper (not shown). While ther are many known recording mechanisms applicable to this case, a discharge destruction type or electrolytic type recording paper may be preferably utilized since the recording pen can contact always with the recording paper. This invention will be described further in detail hereinunder in conjunction with an embodiment in which the recording pen moves as contacting with the recording paper. As well understood from the above description, the distance from the predetermined reference position to the recorded spot on the recording paper is proportional to the count output of the counting circuit 4 which is equivalent to the measured value from the digital measuring apparatus 7. Thus, a record of the measured digital value can be obtained.

Figure 2:
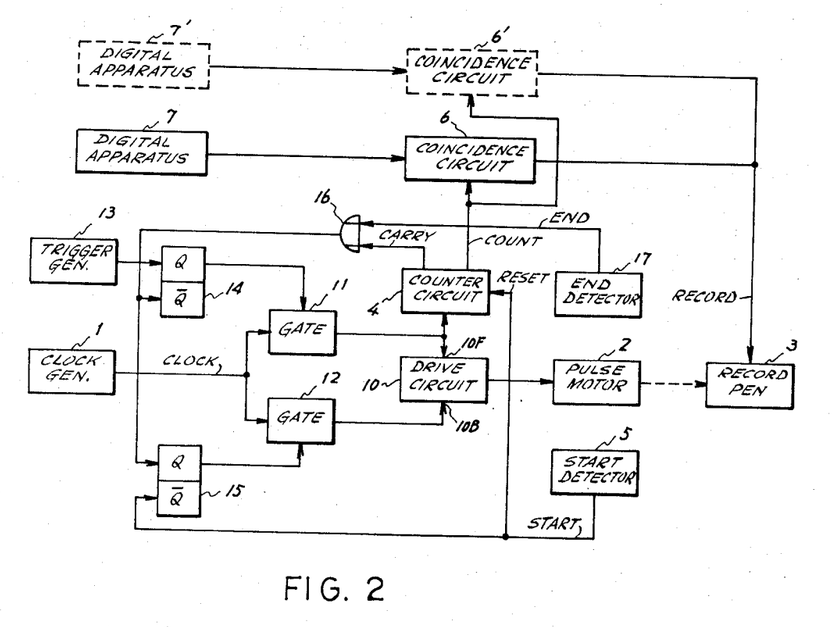
FIG. 2 is a block diagram representing a typical configuration of an embodiment of the recording device of this invention.

As the recording pen 3 moves always to the same direction in the system of FIG. 1, it must be carried on a rotary disc or an endless belt or drawn back by some means in order to restore the reference position and effect a next record. FIG. 2 shows an embodiment of the device of this invention which includes an improved automatic recording pen restoration system and FIGS. 3, 4 and 5 show examples of the mechanical structure thereof.

In FIG. 2 the output of a clock pulse generator 1 is coupled through a gate 11 to a FORWARD input 10F of a pulse motor driving circuit 10 and is also coupled through a gate 12 to a BACKWARD input 10B of the circuit 10. The output of the pulse motor driving circuit 10 is applied to a pulse motor 2 which drives a recording pen 3. The clock pulse output of the gate 11 is also applied to a counting circuit 4 and a COUNT output of the counting circuit 4 is coupled to a coincidence circuit 6. Another output, CARRY output, of the coupling circuit 4 is connected to one input of an OR gate 16, the other output of which is connected to the output of an end detector 17. The output of the OR gate 16 is coupled to $\bar{Q}$ terminal of a flip-flop 14 and Q terminal of a flip-flop 15. Q terminal of the flip-flop 14 is connected to the output of a trigger pulse generator 13 and $\bar{Q}$ terminal of the flip-flop 15 is connected to the output of a start detector 5 whose output is also coupled to a RESET terminal of the counting circuit 4. The outputs of the flip-flops 14 and 15 are respectively coupled to the control electrodes of the gates 11 and 12.

Figure 3:
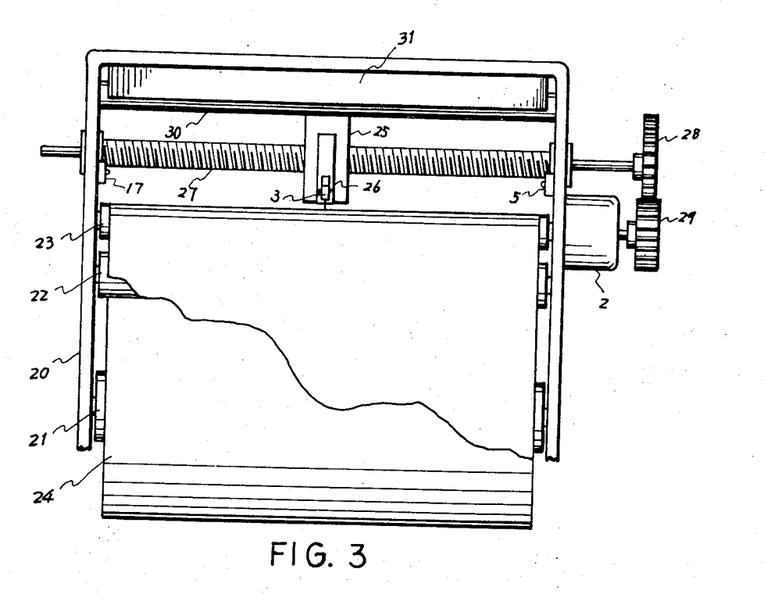
FIG. 3 is a front elevational view of recording apparatus for use with the embodiment of FIG. 2.
Figure 4:
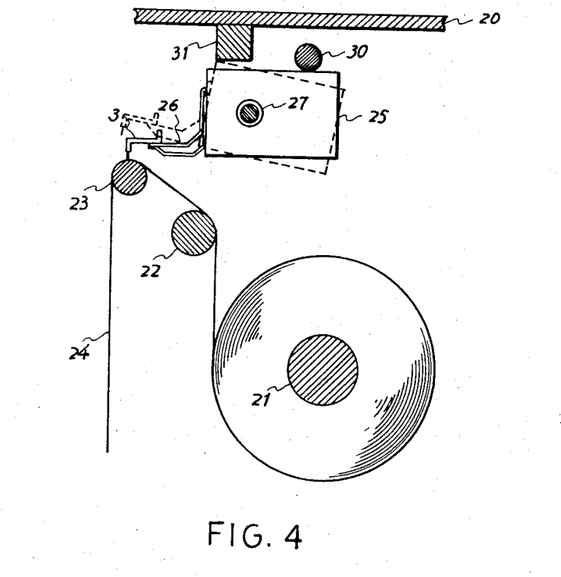
FIG. 4 is a schematic cross-sectional view of the apparatus of FIG. 3.
Figure 5:
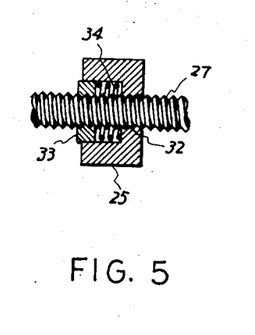
FIG. 5 is a fragmentary cross-sectional view of the stylus support for the device of FIG. 4.

In FIGS. 3 and 4, a recording paper 24 wound on a reel 21 supported on a frame 20 is rewound through rollers 22 and 23 which are also supported on the frame 20. The frame 20 further supports a threaded shaft 27 which is rotationally coupled through toothed wheels 28 and 29 to a pulse motor 2. The threaded shaft 27 passes through a recording pen holder 25 such that the male screw on the shaft 27 engages with the female screw in the holder 25 and the holder 25 is driven to the right and left in accordance with rotation of the shaft 27. A recording pen 3 is supported through a resilient member 26 by the holder 25 and arranged to contact with the recording paper on the rewinding roller 23 as shown. Contact switches 5 and 17 are fixed to both side walls of the frame 20 to serve as the start and end detectors 5 and 17 of FIG. 2 when the pen holder 25 comes in contact therewith.

In operation, at first, the pen holder 25 is assumed to be in the rightmost position and in contact with the contact switch 5, that is, the start detector 5 of FIG. 2. Therefore, the start detector 5 produces a START signal and the START signal is applied to the RESET terminal of the counting circuit 10 to reset it to a READY condition and also applied to the $\bar{Q}$ terminal of the flip-flop 15 to drive the Q side into a LOW level and close the gate 12. On the other hand, a trigger pulse train having a relatively long pulse interval is produced from the trigger pulse generator 13 and the trigger pulse turns the Q side of the flip-flop 14 into HIGH level and opens the gate 11. A train of clock pulses are supplied from the clock pulse generator 1 to the FORWARD terminal 10F of the pulse motor driving circuit 10 through the open gate 11. Then, the pulse motor 2 is driven forward by the output of the driving circuit 10 and drives the threaded shaft 27 such that the recording pen holder 25 is moved from right to left.

At the same time, the clock pulses supplied through the gate 11 to the counting circuit 4 is counted therein. The COUNT outputs are successively supplied from one terminal of the circuit 4 to the coincidence circuit 6 and compared therein with a digital measured value supplied from a digital measuring apparatus 7 and, when a coincidence is detected therebetween, the coincidence circuit 6 supplied a RECORD signal to the recording pen 3 to effect a record as in the case of FIG. 1.

Thereafter, the recording pen holder 25 is further driven to the same direction and comes in contact with the contact switch 17 (FIG. 3) of the end detector 17 (FIG. 2). The end detector produces an END signal and the signal is supplied through the OR gate 16 to the flip-flops 14 and 15 to turn the $\bar{Q}$ side of the flip-flop 14 and the Q side of the flip-flop 15 into HIGH level. Thus, the gate 11 is closed and the gate 12 is opened. Accordingly, the clock pulses from the clock pulse generator 1 are now supplied through the gate 12 to the BACKWARD input 10B of the driving circuit 10 and the output of the circuit 10 drives the pulse motor backwards. Consequently, the threaded shaft 27 (FIG. 3) begins to rotate in the opposite direction and draws the pen holder 25 back from left to right until the holder 25 comes in contact with the contact switch 5. When the holder 25 comes in contact with the switch 5, one scanning operation is completed and the whole system returns to the original condition. Then, the same operation is repeated continuously. It is a matter of course that the recording paper 24 is driven at a suitable speed though the paper driving mechanism is not shown in the drawings for the purpose of simplification.

Instead of the end detector 17, an END signal can be produced from the counting circuit 4. For this purpose, the counting circuit 4 is previously arranged to produce a CARRY signal when a predetermined count which corresponds to the width of the recording paper is reached. The CARRY signal is supplied to the other input of the OR gate 16 as the END signal. In this case, the end detector 17 may be omitted or used as a safeguard.

If another coincidence circuit 6' which receives measured values from another digital measuring apparatus 7' is added as shown in FIG. 2, this inventive device becomes to be able to record two phenomena on the same recording paper. It is evident that three or more phenomena can be recorded by this recording device in the same fashion.

Although the recording pen 3 may be in contact with the recording paper 24 during its forward movement, it is unnecessary or undesirable that this contact is kept also during the backward movement. The embodiment of FIG. 3 is provided with an improved mechanism of keeping the recording pen 3 away from the recording paper 24 during the backward movement. It will be described now in detail with reference to FIGS. 4 and 5.

In the device of FIGS. 3 and 4, the recording pen holder 25 is supported by the threaded shaft 27 only. If the threaded shaft 27 is a right-handed screw, the recording pen 3 is moved from right to left by anticlockwise rotation of the shaft 27 in FIG. 2. In this case, the pen 3 is pressed against the recording paper 24 due to frictional rotation of the pen holder 25. A rod 30 is provided for preventing excessive rotation of the holder 25. However, when the pen 3 is moved backwards, from left to right, it is lifted up and kept away from the recording paper as shown by a dotted contour in FIG. 4 by clockwise frictional rotation of the holder 25 until the holder 25 comes in contact with a stopper bar 31. This arrangement is quite advantageous since it does not need any additional component other than the simple stopper rod and bars 30 and 31 for providing the above automatic pen lifting function. The frictional rotation of the pen holder 25 is facilitated and ensured by a simple modification as shown in FIG. 5 representing a sectional front view of the pen holder 25. A depression is formed around the screw hole 32 of the pen holder 25 in which the threaded shaft 27 is screwed, and a helical spring 34 is put in depression and a nut 33 is screwed against the spring 34. The nut 33 is so arranged that it is freely movable in the axial direction but cannot rotate with respect to the pen holder 25.

Thus, the frictional force is appreciably raised to ensure the above function.

Figure 6:
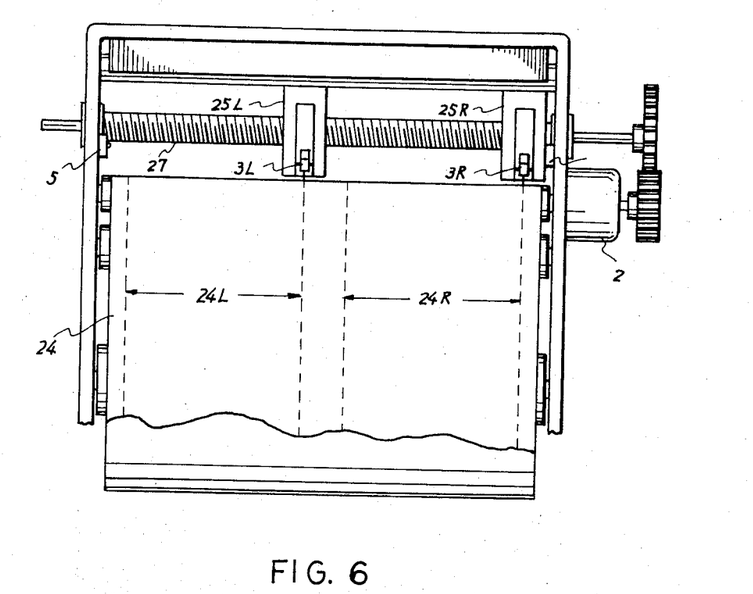
FIG. 6 is a front elevational view of another embodiment of recording apparatus according to this invention.

Referring next to FIG. 6, there is shown a modification of the recording device of this invention in which two recording pen holders 25L and 25R which carry recording pens 3L and 3R respectively are supported on the same threaded shaft 27. In this arrangement, the output recording signals of the coincidence circuits 6 and 6' in FIG. 2 are separately applied to the recording pens 3L and 3R. As readily understood, the device of FIG. 6 can record two phenomena on separate zones 24L and 24R of the recording paper 24. It is self-evident that the number of recording pens can be further increased as occasion demands in order to record many phenomena on separate zones of the same recording paper.

Figure 7:
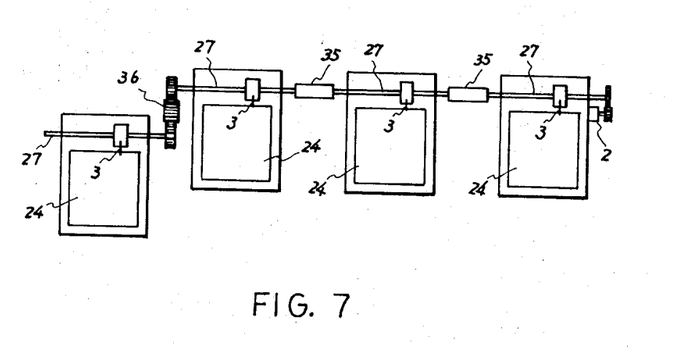
FIG. 7 is a schematic diagram representing an example of the combination in practical use of the recording devices of this invention.

Similarly, plural phenonena can be recorded on separate recording papers respectively. As shown in FIG. 7, in this case, a plurality of recording devices of this invention are arranged and their threaded shafts 27 are coupled with each other through couplings 35 or gears 36 so that all the shafts 27 re driven by a single pulse motor 2. The output RECORD signals of the respective coincidence circuits, 6, 6' ..... are respectively supplied to the recording pens 3 of the respective recording devices.

In the device having a control circuit as shown in FIG. 2, the recording pen 3 must move to the predetermined end position which may be the other end of the width of the recording paper after effecting a record on the paper and return to the original start position before effecting the next record. However, in the improved modification shown in FIG. 8, the recording pen can move directly to the next recording position after effecting each record without passing the start and end positions.

Figure 8:
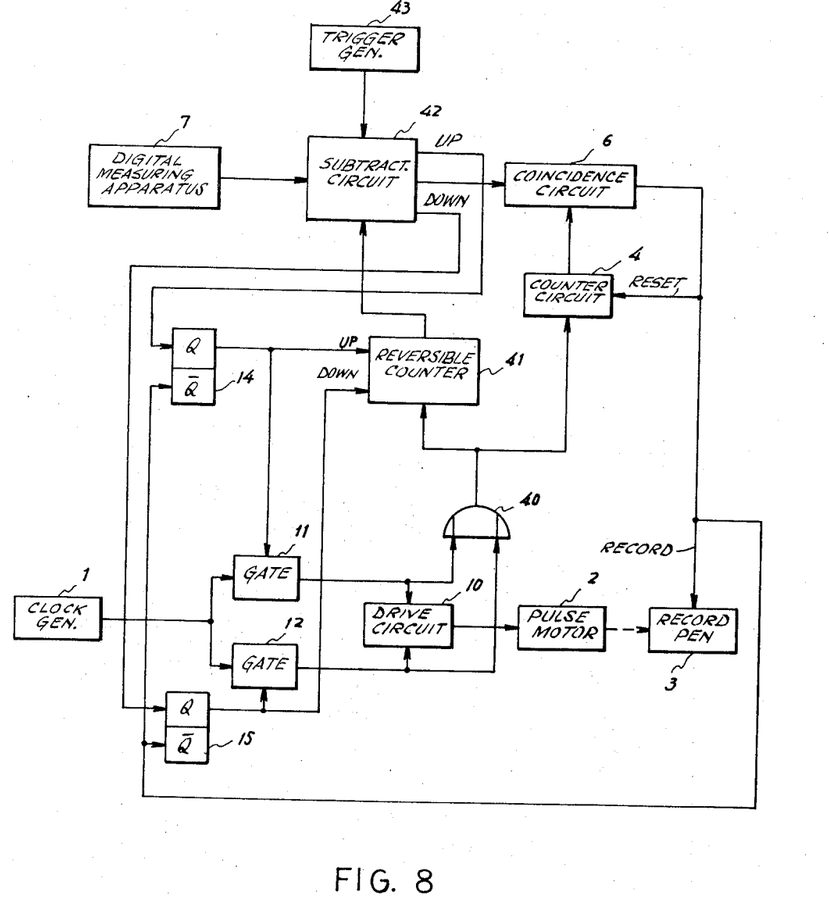
FIG. 8 is a block diagram representing an improved modification of the embodiment of FIG. 2.

In FIG. 8, the outputs of the gates 11 and 12 are supplied through an OR gate 40 to a reversible counter 41 as well as the counting circuit 4 whose output is applied to the conicidence circuit 6. The output COUNT of the reversible counter 41 is supplied to a subtraction circuit 42, the other input of which is the measured value from the digital measuring apparatus 7. The subtraction circuit 42 is arranged to be triggered by a gripper pulse train having a suitable pulse interval from a trigger pulse generator 43 and to effect a subtraction operation between both inputs. The subtraction circuit 42 produces a subtraction output which is supplied to the coincidence circuit 6 and, at the same time, produces UP or DOWN signals based upon the result of subtraction. The UP signal is supplied through the flip-flop 14 to the UP terminal of the reversible counter 14 and the control terminal of the gate 11 and the DOWN signal is supplied through the flip-flop 15 to the DOWN terminal of the counter 41 and the control terminal of the gate 12. The RECORD signal from the coincidence circuit 6 is also supplied to the reset terminal of the counting circuit 4 and to the $\bar{Q}$ sides of the flip-flops 14 and 15.

In operation, the pulse motor 2 and the recording pen 3 are driven forwards or backwards by the clock pulse train supplied from the clock pulse generator 1 through the gate 11 or 12 to the driving circuit 10 as same as in the system of FIG. 2. When one record is effected, the RECORD signal is applied to the counting circuit 4 to reset it and also applied to the $\bar{Q}$ sides of the both flip-flops 14 and 15 to turn them into HIGH level, thereby the both gates 11 and 12 are closed and the pulse motor 2 and the recording pen 3 are stopped in place. The reversible counter 41 continues to produce an output corresponding to the position of the recording pen 3.

Assuming now that the input value from the measuring apparatus 7 when a trigger pulse is applied from the trigger pulse generator 43 to the subtraction circuit 42 is greater than the output value of the reversible counter 41, the subtraction circuit 42 produces a difference output to the coincidence circuit 6 and, at the same time, an UP signal to the Q side of the flip-flop 14 to open the gate 11. Thus, the recording pen 3 is driven forwards and the clock pulses are counted by the counting circuit 4. When the count output of the counting circuit 4 becomes equal to the difference output of the subtraction circuit 42, the coincidence circuit 6 produces a RECORD signal to effect a record. The RECORD signal resets the counting circuit 4 and stops the recording pen 3. Thus, the system is ready for the next recording.

If the count output of the reversible counter 41 is less than the measured value from the measuring apparatus 7, the subtraction circuit 42 produces a DOWN signal as well as the difference output. The DOWN signal is applied to the Q side of the flip-flop 15 to open the gate 12. Therefore, the pulse motor 2 is driven backwards and the recording pen 3 is drawn back by a distance corresponding to the difference output of the subtraction circuit 42 to a position at which the next record is to be effected.

Figure 9:
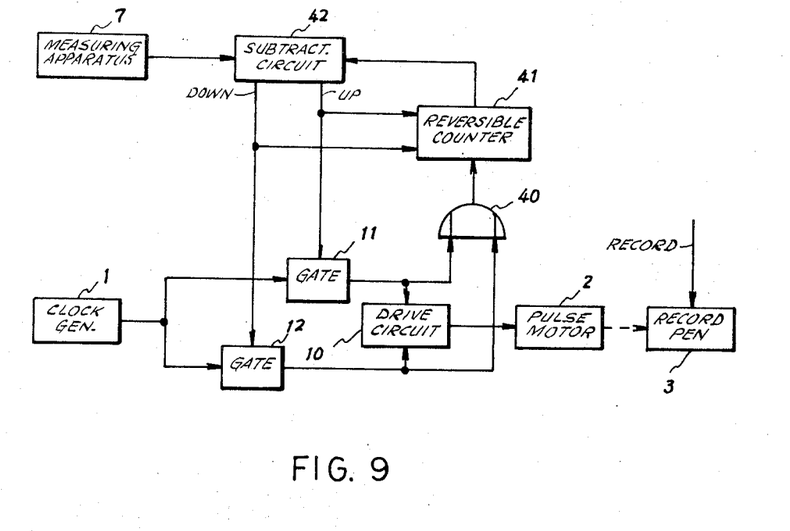
FIG. 9 is a block diagram representing a modification of the configuration of FIG. 8.
Figure 10:
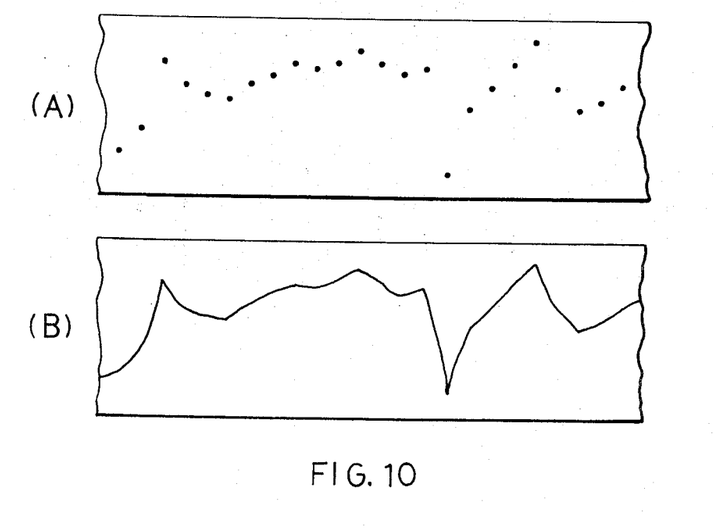
FIGS. 10(A) and 10(B) are schematic views representing examples of recorded patterns produced by the devices of FIGS. 8 and 9 respectively.

In the devices according to the abovementioned arrangements, the record is intermittently effected in response to the recording signal supplied from the coincidence circuit 6 as shown in FIG. 10(A) though the recorded value corresponds very accurately to the measured value. However, in some cases, for example, where the mode of change is deemed more important than the accuracy of the recorded value, a continuous recording as shown in FIG. 10(B) may be desired. The arrangement shown in FIG. 9, which is a modification of the arrangement of FIG. 8, presents a device for effecting such a continuous recording.

In FIG. 9, the counting circuit 4, the coincidence circuit 6, the flip-flops 14 and 15 and the trigger generator 43 are omitted from the circuit of FIG. 8, and UP and DOWN signals from the subtraction circuit 42 are directly supplied to the gates 11 and 12, respectively, and the recording signal is continuously supplied to the recording pen 3 from a separate d.c. current source (not shown).

As same as in the circuit of FIG. 8, the reversible counter 41 produces an output representing a digital value which corresponds a moving distance of the recording pen from the reference start position and the output is compared in the subtraction circuit 42. The subtraction circuit 42 produces UP and DOWN signals respectively when the measured value is greater than the counter output and when the former is less than the latter. The UP and DOWN signals are supplied to the reversible counter 41 to control the direction of counting, and, at the same time, applied to the gates 11 and 12 respectively to control the direction of rotation of the pulse motor 2 and, accordingly, the direction of movement of the recording pen 3. As the comparison of the measured value and the counter output is effected at each of the clock pulses and the recording signal is continuously supplied to the recording pen 3, the device gives an apparently smooth and continuous trace recorded on the recording paper as shown in FIG. 10(B) if the frequency of the clock pulse is selected properly.

Although it is omitted from FIGS. 8 and 9, it should be understood that the both arrangements are provided with a start detector which is similar to that aforementioned for detecting the reference position, for example, zero point, and its output is applied to the reversible counter 42 to reset it.

As described in the above, the device of this invention can record a variable digital measured value directly on a recording paper without any necessity of digital analog conversion operation.

What is claimed is:

1. A digitally controlled recording device, comprising a clock pulse generator for gathering a train of clock pulses, a pulse motor driven by said clock pulses, at least one recording pen driven by said pulse motor, a counting circuit for counting said clock pulses, at least one coincidence circuit for comparing the count output of said counting circuit with a measured digital value and producing an output when a coincidence takes place there between, said output being supplied to said recording pen for effecting a record, means of detecting a predetermined first reference position of said recording pen which defines the start point of the recording range and producing a first detection output, said counting circuit being reset by said first detection output.

2. A digitally controlled recording device, according to claim 1, characterized by a provision of means of detecting a predetermined second reference position of the recording pen which defines the end point of the recording range and producing a second detection output, means of driving said pulse motor forwards in response to said first detection output and backwards in response to said second detection output.

3. A digitally controlled recording device, according to claim 2, characterized in that said recording pen is supported by a recording pen holder having a female screw which engages with a male screw formed on a rotating shaft which is driven by said pulse motor, and said screws are arranged so that said recording pen is pressed against a recording paper by a torque due to a friction between said both screws when said shaft is driven forwards but lifted up from the recording paper by an opposite torque due to the same friction when said shaft is driven backwards.

4. A digitally controlled recording device, according to claim 2, characterized in that said means of detecting a second reference position is a carry circuit included in said counting circuit, said carry circuit being preset to produce an output when a predetermined count corresponding to the width of the recording range is attained.

5. A digitally controlled recording device, comprising a clock pulse generator for generating a train of clock pulses, a pulse motor driven by said clock pulses, a recording pen driven by said pulse motor, a counting circuit for counting said clock pulses, a reversible counter for counting said clock pulses, a subtraction circuit for subtracting the output of said reversible counter from a measured digital value and producing a difference output and UP or DOWN signal, said UP and DOWN signals being supplied to said reversible counter for controlling the sign of counting operation, a coincidence circuit for comparing the output of said counting circuit with the difference output of said subtraction circuit and producing an output when a coincidence takes place therebetween, said output being supplied to said recording pen for effecting a record and to said counting circuit for resetting same, means of driving said pulse motor forwards and backwards in response to said UP an DOWN signals respectively, and means of stopping operations of said driving means and reversible counter in response to the output of said coincidence circuit.

* * * * *

UNITED STATES PATENT OFFICE
CERTIFICATE OF CORRECTION

Patent No. 3,806,948    Dated April 23, 1974

Inventor(s) Shuji Nagao et al.

It is certified that error appears in the above-identified patent and that said Letters Patent are hereby corrected as shown below:

On the cover sheet insert

[30] Foreign Application Priority Data

| Japan | 47-70186 | July 12, 1972 |
| Japan | 48-2306 | Dec. 30, 1972 |

Signed and sealed this 26th day of November 1974.

(SEAL)
Attest:

McCOY M. GIBSON JR.
Attesting Officer

C. MARSHALL DANN
Commissioner of Patents